United States Patent [19]

Schwind et al.

[11] 4,302,881

[45] Dec. 1, 1981

[54] CALIBRATED CONDUIT CALIPER AND METHOD

[75] Inventors: Edward C. Schwind, Burleson; Bobby J. Hallmark, Fort Worth, both of Tex.

[73] Assignee: Gearhart Industries, Inc., Forth Worth, Tex.

[21] Appl. No.: 135,723

[22] Filed: Mar. 31, 1980

[51] Int. Cl.³ ........................... G01B 7/12; G01B 7/28
[52] U.S. Cl. ................................. 33/178 F; 33/149 J
[58] Field of Search ............ 33/178 F, 143 R, 143 E, 33/147 K, 148 H, 149 J, 178 E

[56] References Cited

U.S. PATENT DOCUMENTS

| | | | |
|---|---|---|---|
| 2,695,456 | 11/1954 | Roberts | 33/178 F |
| 2,795,856 | 6/1957 | Reesby et al. | 33/178 F |
| 2,810,203 | 10/1957 | Bachofer | 33/178 F |
| 2,925,660 | 2/1960 | Raulins | 33/178 F |
| 2,927,377 | 3/1960 | McMahan | 33/178 F |
| 3,259,990 | 7/1966 | Key, Jr. | 33/178 F |

*Primary Examiner*—Willis Little
*Attorney, Agent, or Firm*—James M. Peppers; James H. Dautremont

[57] ABSTRACT

A well conduit caliper tool which simultaneously measures the remaining wall thickness of a well conduit in situ and the minimum inside diameter of such conduit. A caliper feeler arm element which extends out the furthermost distance from the caliper tool activates a sensing element that produces the indication of remaining conduit wall thickness. Another caliper feeler arm element which extends out the least distance from the caliper tool activates another sensing element that produces the indication of the minimum inside diameter. At the earth's surface these indications are recorded on a continuous strip chart or log as the variation of such respective diameters through the interval of conduit measured by the caliper tool. Mechanical linkage wear compensation and linear mechanical movement through the linkage between the feeler arm elements and the sensing elements are provided.

In conjunction with the caliper tool is a diameter calibration apparatus and method including a calibration tube adapted to fit about the caliper tool at the earth's surface. The calibration tool provides designated simulated remaining wall thickness and simulated minimum internal diameters as standards from which the caliper tool is calibrated at the earth's surface.

9 Claims, 11 Drawing Figures

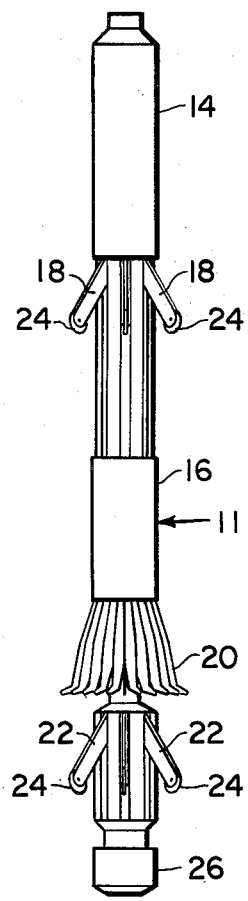
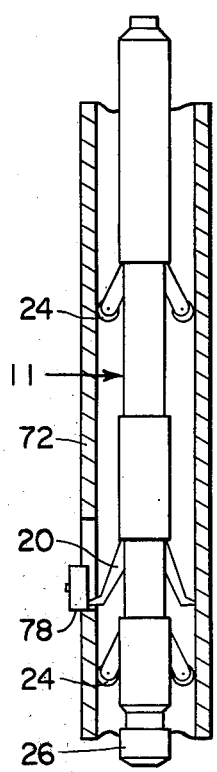
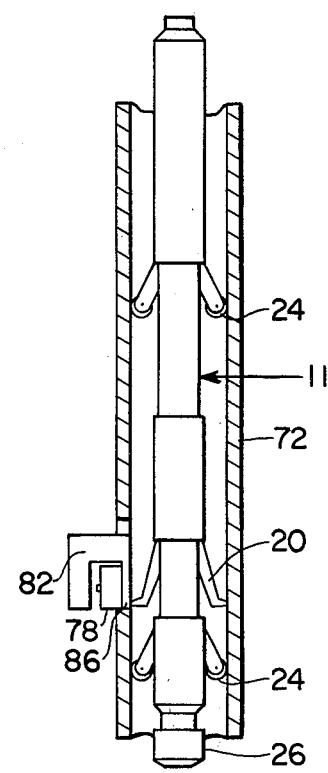
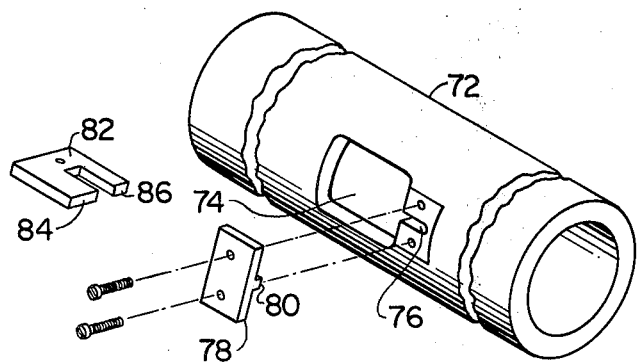
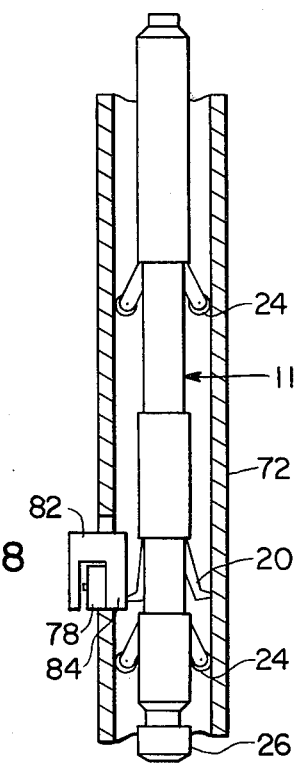

4,302,881

CALIBRATED CONDUIT CALIPER AND METHOD

BACKGROUND OF THE INVENTION

The field of this invention is calipers for detecting internal diameters and more particularly for detecting the variations in internal diameter of pipe or conduit.

Prior art showing calipers of this general kind are shown in U.S. Pat. Nos. 2,638,681, 2,864,173, 2,875,525, 2,907,111, 2,908,085, 2,973,583, 2,990,621, 3,010,212, 2,061,938, 3,075,292, 3,423,671, 3,624,684, 3,641,678, 3,685,158, 3,772,794, 4,109,386, and 4,121,345. These disclosures are intended to serve as background information for the disclosure of the present invention and as such are specifically incorporated herein by reference.

In the calipering of pipe, such as well pipe disposed within a well bore, the caliper tool is placed in the pipe and is moved longitudinally therein to obtain a record of the internal surface variations through the length of pipe. The record obtained shows the condition of the pipe throughout its length. The information generally desired on such a record is whether corrosion or other factors have so reduced or changed the wall thickness of the pipe that it is subject to failure. Information is also of value as to the presence of scale, flattening of pipe, and various other causes for a pipe being other than round.

The caliper tool herein disclosed may be provided with 30, 40, or 60 arms, for example, to provide a detailed record of the casing condition. These tools will detect the remaining casing wall thickness, the minimum inside diameter, perforations, corrosion, buckling, splits, and a variety of other casing anomalies as will be hereinafter described. These tools can be used in oil well tubing and casing I.D.'s as small as about 2" and up to as large as the caliper sizes provided.

Once given by the caliper tool, the casing data is assembled by the uphole equipment into a plotted output as later described.

One object provided by the present caliper tool is that it can be initially and very accurately calibrated at the earth's surface for a subsequent measuring pass of the tool throughout the well casing.

Another object of the present invention is that mechanical wear and slack in the linkage commonly associated with previous calipers is automatically compensated in the linkage.

Still another object accomplished by this invention is accurate translation of longitudinal movement from the feeler arms to a rotary movement which is transmitted to a potentiometer for accurate measurement.

Still another object attained by this invention is the apparatus and method for accurately calibrating the caliper with simulated casing conditions but while the caliper is in an accessable position for calibration at the earth's surface.

SUMMARY OF THE INVENTION

A well conduit caliper tool which simultaneously measures the remaining wall thickness of a well conduit in situ and the minimum inside diameter of such conduit. The caliper feeler element which extends out the furthermost distance from the caliper tool activates the sensing element that produces the indication of remaining conduit wall thickness. The caliper feeler which extends out the least distance from the caliper tool activates the sensing element that produces the indication of the minimum inside diameter. At the earth's surface, these indications are recorded on a continuous strip chart or log as the variations of such respective diameters through the interval of conduit measured by the caliper tool. Linkage wear compensation and linear mechanical movement between the feeler elements and the sensing elements is provided.

Also in conjunction with the caliper tool is a diameter calibration apparatus and method including a calibration tube adapted to fit about the caliper tool at the earth's surface. The calibration apparatus provides simulated remaining wall thicknesses and simulated minimum internal diameters as standards from which the caliper tool is manually calibrated at the earth's surface.

Now referring to the drawing:

FIG. 2 is a partial elevational view of the caliper tool shown in FIGS. 1a and 1b;

FIG. 3 is an enlarged view of the structure enclosed in the dashed line identified at 3 on FIG. 1a;

FIG. 5 is an exploded isometric view of a calibration sleeve apparatus used in connection with the caliper tool shown in FIGS. 1a, 1b, and 2;

FIG. 6 is a schematic view of the caliper tool positioned within the calibration sleeve with a selected feeler arm positioned in a first position;

FIG. 7 is a schematic view of the caliper tool positioned within the calibration sleeve with a selected feeler arm positioned in a second position;

FIG. 8 is a schematic view of a caliper tool positioned within the calibration sleeve with a selected feeler arm in a third position.

FIG. 10 is a detailed view of the potentiometer, bearing and seal arrangement enclosed in the dashed line identified at 10 on FIG. 1a.

DESCRIPTION OF A PREFERRED EMBODIMENT

Figure 1A:
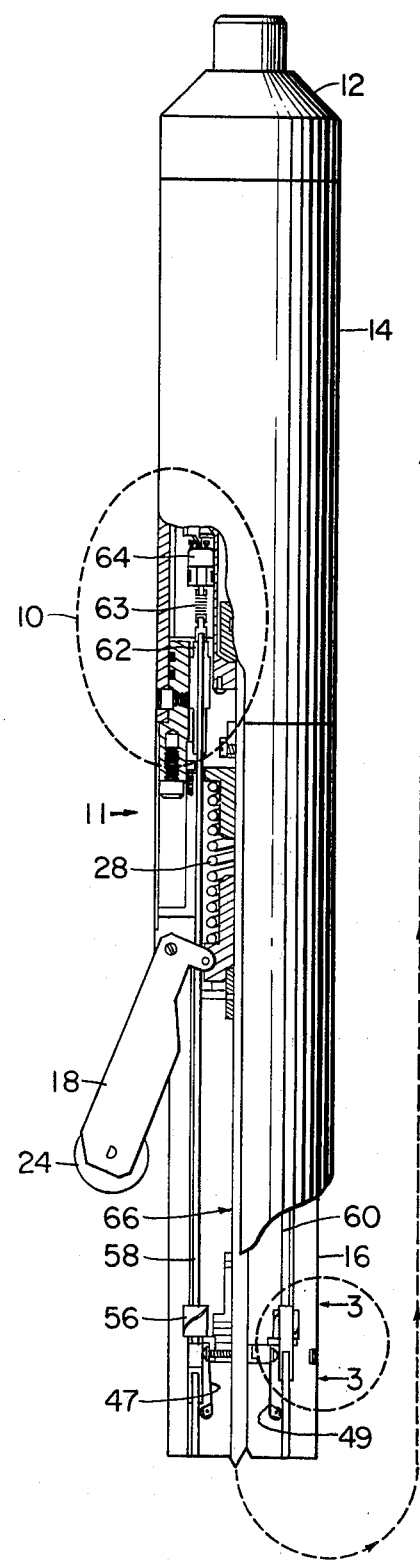
FIGS. 1a and 1b are the upper and lower sections, respectively, of a caliper tool shown partially in elevational cross section.
Figure 1B:
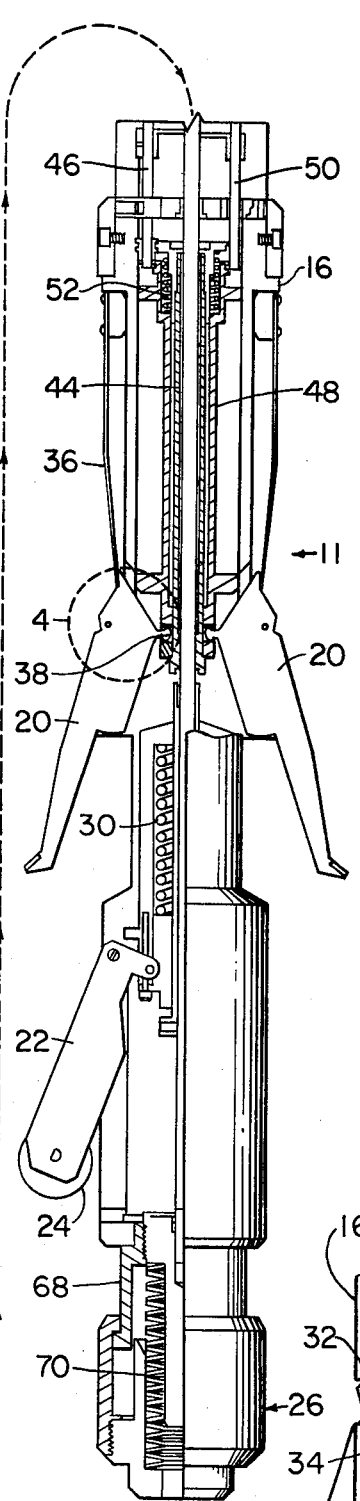

Referring to FIGS. 1a, 1b, and 2, the disclosed caliper tool 11 may utilize a standard single conductor cable (not shown) for all power and data transmission, which is accomplished through a multiplexer built in the tool electronic assembly. Such transmission system is commonly known and is not described herein in detail. The tool uses two rotary potentiometers to convert casing information into electronical signals.

The electronics which are located in the upper end of the tool (not shown) are sealed as is usual to protect from the downhole environment.

The caliper tool may have several centralizer arms 18 and 22 located above and below caliper feeler arms 20. The centralizer arms hold the tool coaxially centered in the casing, assuring an accurate data readout. The feeler arms 20 are individually spring loaded and any feeler arm can position either the "minimum wall thickness" with the most extended arm and the "maximum wall thickness" with the least extended arm, with such data being sent to the earth's surface. The feeler arms have hardened tips to extend their service life and are available in either a regular or wide tip version. The wide tip version is used for casings with slotted liners.

Further referring to FIGS. 1a, 1b, and 2, there is shown a caliper tool 11 having a cable attachment head 12, a sensing circuit and motor section 14, and a mechanical caliper section body 16. Mounted in body 16 are upper centralizer arms 18, feeler arms 20, and lower centralizer arms 22. As shown, all the centralizer arms are equipped with rollers 24 at the distal end of each arm.

A casing gauge section 26 including a shock absorbing arrangement, as later described, may be provided and mounted at the lower end of body 11, particularly when the tool 11 is to be run through well tubing. The purpose of the gauge section is to prevent passage of tool 11 through tubing seating or landing nipples, preventing the tool from passing out the bottom of tubing, or sticking at the bottom of tubing, for example.

The various small parts are not numbered, nor their purpose and function described, since they are merely apparent means to augment the support and operation of the more essential elements as herein described.

Figure 9:
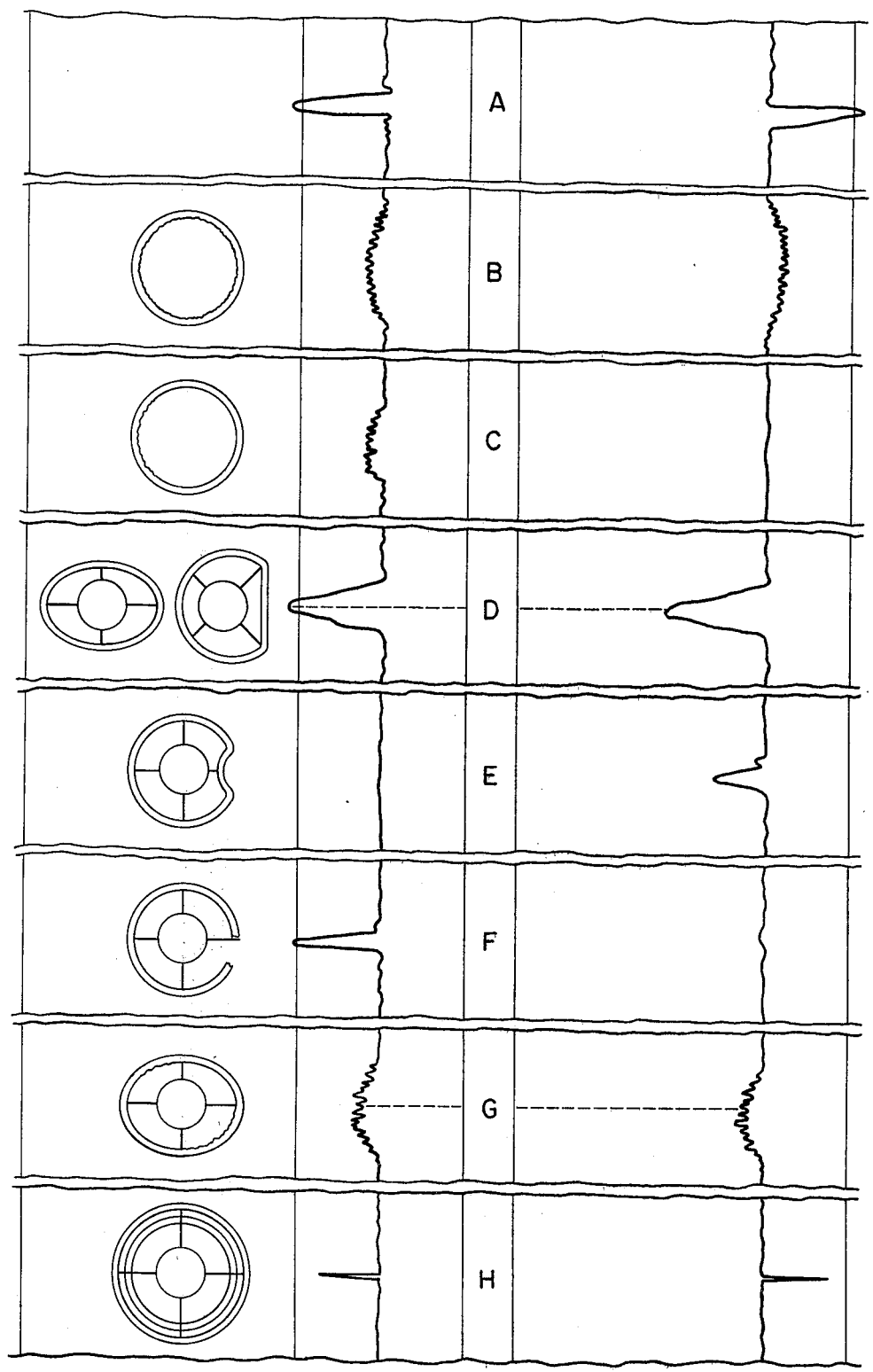
FIG. 9 illustrates a plurality of charts A through H which are illustrations of the positions of the caliper feeler arms of the caliper tool which illustrations are representative of internal configurations of conduit calipered by the tool.

Referring briefly to FIG. 9 in view of FIG. 2, each of the large number of feeler arms 20 (which, for example, may be 30, 40, or 60 in number for different sizes of well pipe in which the caliper tool 11 traverses) touches against the inside of the conduit in closely spaced relation so that a small anomaly in radius within the pipe will be detected by at least one of the arms 20. The arm 20 which extends out the most in radial distance actuates a potentiometer 64 to produce a first curve, which is variously indicated at the left in the charts A through H of FIG. 9 and which is hereinafter denoted as the "minimum wall" (thickness) curve.

The arm 20 which is confined to extend out the least in radial distance, acutates a second potentiometer 64 to produce a second curve, variously indicated at the right in the charts A through H of FIG. 9, which is hereinafter denoted as the "maximum wall" (thickness) curve. The maximum wall thickness curve may show deposits on the pipe interior, such as scale, or show partially collapsed or other pipe deformities as later described.

Now referring to FIGS. 1a, 1b, and 2, the centralizer arms 18 and 22 are respectively mounted in the tool body 16 in pivoted relationship such that spring biasing means 28 and 30 respectively urge each set of centralizer arms out equilaterally and thus continually urge the tool 11 into substantially coaxial relationship within a pipe or conduit (see analog in FIGS. 6-8, for example).

The feeler arms 20 are radially disposed and equally spaced around the axis of tool 11 (see FIGS. 2, and 6-8) such that the distal tip of each feeler arm may be urged outwardly to touch a respective part of the interior wall of a pipe or conduit.

Figure 4:
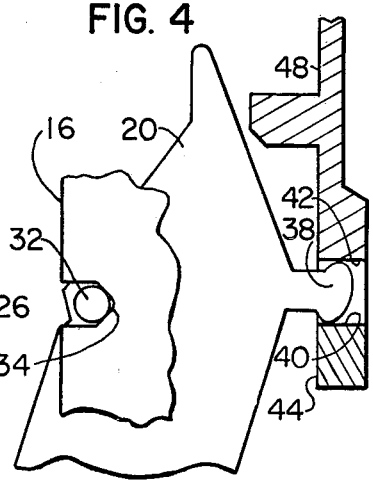
FIG. 4 is an enlarged view of the structure enclosed in the dashed line identified at 4 on the FIG. 1b.

As particularly shown in FIG. 4, each of the feeler arms 20 is carried by a pivot pin or shaft 32, with each pivot pin 32 being seated in a V-bearing 34 defined in part of body 16. Each feeler 20 is urged to extend radially by a respective bias spring 36 as shown.

It is to be noted that any slack between pivot pin 32 and the V-bearing 34, as would ordinarily be caused by wear of the bearing surfaces, is inherently compensated by the decreasing available effective bearing diameter within the "V" of the V-bearing as shown.

Each feeler arm 20 is provided with a motion transfer dog 38 which, in the assembled tool 11, extends into a recess defined by an annular lower shoulder face 40 and an annular upper shoulder face 42.

The shoulder forming face 42 is part of a generally cylindrical transfer member 48 which is reciprocally mounted within tool body 16. A vertical caliper push rod 50 is connected to the upper end of transfer member 48.

The shoulder forming face 40 is part of another generally cylindrical transfer member 44 which is reciprocally mounted within transfer member 48 as shown. Extending up from connection with transfer member 44 is a push rod 46. A biasing spring means 52 is nested between transfer member 44 and 48 and between abutting faces respectively provided on each transfer member. The spring means 52 urges the faces 40 and 42 into forceful contact with the dogs 38 located all around these faces.

Thus, slack or play between the transfer dog 38 and the faces 40 and 42 is not permitted to occur, even though the face surfaces in contact are moved various distances apart as will become more apparent.

Through the mechanical linkage, including the biasing of spring 36, a pin 32/V-bearing 34, a transfer dog 38, the face 42, the transfer member 48, biasing spring 52, and the push rod 50, it may readily be seen that there is spring biased slack-free connection between the arcuate movement of the tip of a feeler arm 20 and the push rod 50. This movement will be denoted the "maximum wall thickness" (minimum I.D.) measurement.

Similarly, with the bias of a canitlever spring 36, another pin 32/V-bearing 34, another transfer dog 38, the face 40, the transfer member 44 (in this case urged by the compressive bias of spring means 52) and the push rod 46, it may readily be seen that there is spring biased slack-free movement between another feeler arm 20 and the push rod 46. This movement will be denoted the "minimum wall thickness" (maximum I.D.) measurement.

It is apparent, but also noted, as two respective feeler arms 20 independently extend to find the maximum I.D. and the minimum I.D., that each of the transfer members 44 and 48 are moved independantly of the other with compensating flexure of the biasing spring means 52 to maintain the faces 40 and 42 in continued contact with transfer dogs 38.

Figure 3:
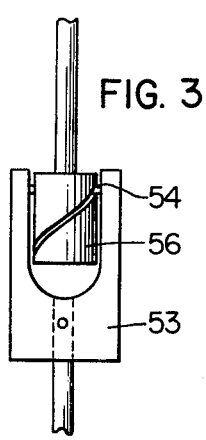

As seen in FIG. 1a, the two push rods 46 and 50 terminate at their upper ends into respective connection with two guide forks 53 as best shown in FIGS. 1a, and 3. Each of guide forks 53 are equipped with at least one, and preferably two, rotary guide pins 54. A rotor drum 56, having a helical rotary transfer groove, or grooves, defined into its cylindrical surface, is nested in movable relation within the "tines" of the fork 53 with a guide pin 54 fitted into each of such grooves. Each guide pin 54 is preferably provided rectangular in shape to better fit into its respective groove.

As seen in FIG. 1a, each of the rotor drums 56 is connected to the lower end of a rotary transfer shaft 58 and a rotary transfer shaft 60, respectively. The combination shown in FIG. 3 may be considered a linear/rotary motion transfer component.

As best seen in FIG. 1a, the guide pins 54 of fork 53 are urged against the groove walls of rotor drum 56 by means of preload spring 47 and 49 being in forceful contact against shafts 46 and 50, as shown.

Figure 10:
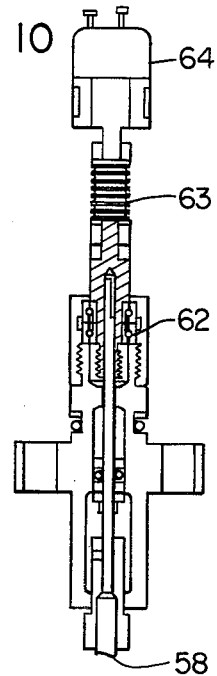

As shown in FIGS. 1a and 1b, the push rods 46 and 50 may reciprocate but not rotate while the rotor drums 56 may rotate but not move vertically in response to vertical movement of the guide pins 54 within the helical grooves of the rotor drums. As seen at the upper part of FIG. 1a and in FIG. 10, the upper ends of transfer shafts 58 and 60 are connected through a bearing spindle arrangement 62 and a flexible coupling means 63 into rotary electrical potentiometers 64, respectively.

The bias of the preload springs 47 and 49 eliminates any slack in the linkage between the rotor drum 56 groove walls and the guide pins 54, and thereby between the potentiometers 64 and the push rods 46 and 50, respectively.

Thus, it is manifest that no mechanical lost motion or slack may exist in the mechanical linkage between any respective feeler arm 20 and a pertinent potentiometer 64.

The previously mentioned gauge section 26 includes at least a gauge member 66 telescopically connected with a support member 68 which in turn is attached to the lower end of tool body 16. Compression spring means 70, shown as mounted in compression within gauge section 26, serves to resiliently bias the telescoped members 26 and 68 into extended position. The spring means 70 is shown as comprising Bellville type springs mounted within section 26; however, other kinds of springs can be used and also the spring means 70 can be mounted on the outside rather than inside, as desired.

The gauge section 26 is provided of diameter slightly greater than the effective O.D. of the tool 11 when the feeler arms 20 and the centralizer arms 18 and 22 are in fully retracted position, as when tool 11 is being lowered into a well bore to a position where the calipering operation will be initiated. In this connection, electrical motor latching and release means are provided within section (not shown herein or described) which will hold such arms in retracted position, then extend such arms for tool operation, which can be repeated as desired while the tool is downhole.

As the tool 11 is lowered into a well bore in retracted position, the gauge section 26 will be stopped by collapsed pipe, or the like, and will serve to cushion the stoppage of tool 11 from downward movement, and thus will serve to help prevent hard jamming of the tool 11 in the well bore and consequent sticking of the tool, and to protect its working elements against shock loading.

OPERATION OF THE PREFERRED EMBODIMENT

The tool 11 may be electrically opened and closed in repeated fashion at any logging depth for "repeat logging" for as many times as desired by the operator. In this connection, electrical motor latching and release means are provided within section 14 (not herein shown or described) which will hold such arms in retracted position, then extend such arms for tool operation, which can be repeated as desired.

In operation, the tool 11 is lowered in retracted condition to the deepest location within a well conduit where measurement is desired, then all the arms 18, 20, and 22 of the tool 11 are electrically extended with open/close shaft 66. Tool 11 is then raised through the well conduit with the tips of all the feeler arms 20 in touch with the interior wall of the well conduit.

Within tool 11, the face 40 follows in contact with the transfer dog 38 of whichever feeler arm 20 is extending the *greatest* distance from the centralized tool 11 to find contact within the conduit. The distance of such greatest extension is transmitted through the linkage including the linear transfer member 44, the push rod 46 and the transfer shaft 58 to actuate a potentiometer 64, and to thereby produce a signal corresponding to the *minimum* wall thickness.

Simultaneously, the face 42 follows in contact with the transfer dog 38 of whichever feeler arm is extending the *least* distance from centralized tool 11 to find contact within the conduit. The distance of such least extension is transmitted through the linkage including the linear transfer member 48, the push rod 50 and the transfer shaft 60 to actuate the other potentiometer 64 and thereby produce a signal corresponding to the *maximum* wall thickness.

These two signals are respectively transmitted to the earth's surface and recorded with equipment (not shown) to produce the charts A thru H shown in FIG. 9, and later described.

CALIPER CALIBRATION OF THE PREFERRED EMBODIMENT

The calibration apparatus and method used in conjunction with caliper tool 11 is described with reference to FIGS. 5-8.

FIG. 5 is an exploded isometric illustration of the calibration apparatus of the present invention.

The interior of calibration tube 72, as shown, is provided of internal diameter so as to be used as an analog, or standard, for a respective size of well casing to be calipered.

As provided, the calibration tube 72 has defined in its sidewall a window 74 and a slot 76 longitudinally opening into the window. As best seen in comparing FIG. 5 with FIGS. 6, 7, and 8, a calibration plate 78 is adapted to be fastened over the slot 76 by means of suitable fasteners such as screws. The plate 78 includes an elongated, raised spacer land 80 which extends into the slot 76 to a preselected distance from the interior wall of tube 72.

Also seen in FIG. 5 is a calibration key 82, which is slotted as shown, to define a minimum I.D. spacer finger 84 and a nominal, or normal, I.D. spacer finger 86.

As shown in FIG. 6, the caliper tool 11 may be positioned in co-axially centered and aligned relation within the tube 72 such that any one of the feeler arms 20 may extend into the slot 76 and into touching contact with the spacer land 80, after the plate 78 is attached as shown.

The potentiometers 64 are respectively included in measurement and signaling circuits (not shown) which may be calibrated with their signal outputs corresponding the various positions a potentiometer assumes with respect to the maximum or minimum measuring position of a controlling feeler arm 20. Thus, the tool 11 may be completely assembled and positioned as shown in FIGS. 6-8 and each potentiometer circuit may then be calibrated by its signal output through the logging cable (not shown) which carries tool 11.

During the steps of calibrating the tool 11 as shown in FIG. 6, the feeler arm minimum wall thickness potentiometer 64 would be calibrated as seeing a "hole" in the casing since its extension into the slot 76 may be equal to the actual outside diameter of the casing which will be logged by the caliper, or maximum calibration position for calibrating the caliper tool 11 prior to logging.

As shown in FIG. 7, the caliper tool 11 is positioned with a feeler arm 20 positioned in touching contact with the nominal I.D. spacer finger 86 when the key 82 which has been inserted between the feeler arm 20 and the spacer land 80 as shown.

When calibrating tool 11 in FIG. 7, both the minimum wall thickness circuit and the maximum wall thickness circuit, each including a potentiometer 64, would be calibrated for the nominal I.D. of well casing in its original condition as installed.

As shown in FIG. 8, the caliper tool 11 is positioned with a feeler arm 20 positioned in touching contact with the maximum wall spacer finger 84 inserted as shown.

When calibrating tool 11 as shown in FIG. 8, the maximum wall thickness circuit including a potentiometer 64 would be calibrated for the minimum effective space through which the caliper tool 11 has been permitted to pass with its gauge section 26.

METHOD OF CALIPER CALIBRATION

Normally, the caliper tool 11 is positioned vertically at a working level convenient to operating people. The analog tube is slipped over the tool 11 to enclose the upper centralizer arms 18 and lower centralizer arms 22.

One of the feeler arms 20 is then aligned with the slot 76 of analog tube 72 as shown. The purpose of the window 74 is for manipulation of the calibration key 82 to the positions shown in FIGS. 7 and 8, and also for observation of the position of the feeler arms 20 in all of FIGS. 6, 7, and 8.

It is to be noted that the sequence of positioning a caliper arm 20 to the positions shown in FIGS. 6, 7, and 8 is optional with the tool operator. The required steps are to place a caliper arm 20 in each of the three positions shown and to calibrate the circuits in each position.

As an exemplary sequence, the maximum extension of a caliper arm 20 may be calibrated for the the minimum wall thickness circuit in FIG. 6, an intermediate extension of the caliper arm calibrated as nominal casing I.D. for both the minimum wall and maximum wall circuits, in FIG. 7, and the minimum extension of the caliper arm calibrated for the maximum wall thickness circuit in FIG. 8.

INFORMATION PRODUCED BY THE INVENTION

The charts A thru H of FIG. 9 are illustrative of the information obtained by the caliper of the present invention through casing in various conditions as follows:

Either the right curve or the left curve could be utilized as indicating the maximum wall thickness or the minimum wall thickness. In the charts A thru H, the left curve was produced to indicate the minimum wall (shows wall loss) and the right curve was produced to show the maximum wall (includes buildup).

At the far left of each chart is a schematic representation of a casing with a condition as indicated by the curves on the chart.

The chart A depicts an interval of the casing where the casing is completely parted into separate, spaced apart, sections. Each of the minimum caliper arm and the maximum caliper arm has been extended to its limit.

The chart B depicts a condition where the interior wall of the casing suffers corrosion pitting all around.

The chart C depicts a condition where the casing wall has internal corrosion in part but has substantially full wall thickness in part.

The chart D depicts a condition where the casing is oval in shape or presents a large restriction as by partial collapse.

The chart E depicts a condition where the casing presents a small restriction as by a dent pressed into the casing wall.

The chart F depicts a condition where the casing has a hole, or large external blister, in its sidewall.

The chart G depicts a condition where the casing has a rough bore with small and out of round places.

The chart H depicts a normal casing collar encountered by both the maximum and minimum caliper arms.

Normal casing perforations (not shown) would be indicated as a series of sharp "kicks", as shown by the left curve in chart H.

Other casing conditions as may be depicted will become recognized by those skilled in this art.

It will be apparent to those skilled in this art that there may be various changes made to the embodiment herein disclosed and yet utilize the invention in the concept defined in the appended claims.

We claim:

1. In an internal diameter caliper having a tool body provided to be coaxially aligned within a generally cylindrical conduit, a plurality of feeler arms with each said feeler arm mounted through bearing means with said body and provided to be urged by respective first resilient biasing means to radially extended positions relative to the axis of said tool, a first linear motion transfer means adapted for forceful contact with that first feeler arm having the greatest radial extension of any said feeler arm and adapted for linear movement corresponding to the extension of said first feeler arm, and a second linear motion transfer means adapted for forceful contact with that second feeler arm having the least radial extension of any said feeler arm and adapted for linear movement corresponding to the extension of said second feeler arm, the combination including: a second resilient biasing means operative between said first linear transfer means and said second linear transfer means to urge both said first linear transfer means and said second linear transfer means into forceful lost motion between said first feeler arm, said second feeler arm, said first linear transfer means and said second linear transfer means; a first rotation responsive sensing means and a second rotation responsive sensing means, said first and said second sensing means being respectively connected to said first and said second linear motion transfer means through respective linear/rotary motion transfer means in cooperation with resilient biasing means such that any lost motion between each respective linear motion transfer means and each respective sensing means is eliminated, wherein each of said rotation responsive sensing means is enclosed within an air cavity defined by and isolated from the exterior of said tool, and, wherein a rotary shaft is connected between each said sensing means and a respective said linear/rotary motion transfer means through a fluid tight sealing means and a double race end thrust support bearing means.

2. The caliper of claim 1 wherein said double race end thrust support bearing means includes two races of ball bearings.

3. A well casing caliper calibrating apparatus comprising:
   A. A well casing analog tube having a slot defined in its wall to receive one feeler arm of a plurality of feeler arms of an elongated caliper tool axially centralized within said tube; and
   B. Positioning means operative with said tube variously:

(1) To position said one feeler arm into position representative of a casing wall thickness in a well casing;

(2) To position said one feeler arm into position representative of the nominal internal diameter of said well casing; and (3) To position said one feeler arm into position representative of a designated minimum space through said well casing.

4. A method of calibrating a well casing caliper tool at the earth's surface, said caliper having a plurality of feeler arms, comprising the calibrating steps of:

A. Coaxially centralizing said tool within a casing analog tube to equally confine said feeler arms;

B. Calibrating an indication from said tool while causing one arm of said feeler arms to be in position representing a designated wall thickness of a well casing;

C. Calibrating another indication from said tool while causing said one arm to be in position representing the nominal internal diameter of said well casing: and D. Calibrating a third indication from said tool while causing said one arm to be in position representing a designated minimum space through said well casing;

E. Said calibrating steps being performed in any sequence.

5. In an internal diameter caliper having a tool body provided to be coaxially aligned within a generally cylindrical conduit, a plurality of feeler arms with each said feeler arm mounted through bearing means with said body and provided to be urged by respective first resilient biasing means to radially extended positions relative to the axis of said tool, a first linear motion transfer means adapted for forceful contact with that first feeler arm having the greatest radial extension of any said feeler arm and adapted for linear movement corresponding to the extension of said first feeler arm, a second linear motion transfer means adapted for forceful contact with that second feeler arm having the least radial extension of any said feeler arm and adapted for linear movement corresponding to the extension of said second feeler arm, a second resilient biasing means operative between said first linear transfer means and said second linear transfer means to urge both said first linear transfer means and said second linear transfer means into forceful contact with said first and said second feeler arms, a first rotation responsive sensing means and a second rotation responsive sensing means; said first and said second sensing means being respectively connected to said first and said second linear motion transfer means through respective linear/rotary motion transfer means, the combination wherein:

A. Each of said rotation responsive sensing means is enclosed within an air cavity defined by and isolated from the exterior of said tool; and B. wherein a rotary shaft is connected between each said sensing means and a respective said linear/rotary motion transfer means through a fluid tight sealing means and a double race end thrust support bearing means.

6. In an internal diameter caliper having a tool body provided to be coaxially aligned within a generally cylindrical conduit, a plurality of feeler arms with each said feeler arm mounted through bearing means with said body and provided to be urged by respective first resilient biasing means to radially extended positions relative to the axis of said tool, a first linear motion transfer means adapted for forceful contact with that first feeler arm having the greatest radial extension of any said feeler arm and adapted for linear movement corresponding to the extension of said first feeler arm, a second linear motion transfer means adapted for forceful contact with that second feeler arm having the least radial extension of any said feeler arm and adapted for linear movement corresponding to the extension of said second feeler arm, a second resilient biasing means operative between said first linear transfer means and said second linear transfer means to urge both said first linear transfer means and said second linear transfer means into forceful contact with said first and said second feeler arms, and a first rotation responsive sensing means and a second rotation responsive sensing means; said first and said second sensing means being respectively connected to said first and said second linear motion transfer means through respective linear/rotary motion transfer means, the combination wherein:

A. Said bearing means comprises a shaft and V-bearing means adapted to be biased into forceful bearing engagement by said first biasing means to eliminate lost motion between said shaft and said V-bearing.

7. The apparatus of claim 6 wherein:

A. Each of said rotation responsive sensing means is enclosed within an air cavity defined by and isolated from the exterior of said tool; and B. Wherein a rotary shaft is connected between each said sensing means and a respective said linear/rotary motion transfer means through a fluid tight sealing means and a double race end thrust support bearing means.

8. The caliper of claim 6 further including a shock absorber mounted at the bottom of said tool, said shock absorber comprising a support member connected to the bottom of said tool, a gauge member mounted in axially movable relation with said support member, and biasing means to resiliently bias said gauge member into position axially extended from said tool.

9. The caliper of claim 8 wherein said biasing means comprise a plurality of axially stacked Bellville springs.

* * * * *